(12) United States Patent
Watters et al.

(10) Patent No.: US 6,230,018 B1
(45) Date of Patent: *May 8, 2001

(54) DEVICES AND PROCESSING IN A MOBILE RADIO COMMUNICATION NETWORK HAVING CALIBRATION TERMINALS

(75) Inventors: J. Michael Watters, Kanata; Leo Strawczynski, Ottawa; David Steer, Nepean, all of (CA)

(73) Assignee: Nortel Networks Limited, Montreal (CA)

( * ) Notice: Subject to any disclaimer, the term of this patent is extended or adjusted under 35 U.S.C. 154(b) by 0 days.

This patent is subject to a terminal disclaimer.

(21) Appl. No.: 09/078,500

(22) Filed: May 14, 1998

(51) Int. Cl.[7] .................................................... H04Q 7/20
(52) U.S. Cl. ........................ 455/456; 455/561; 340/988; 342/386; 342/420
(58) Field of Search ........................ 455/456, 562, 455/506, 457, 560; 379/211; 372/357, 385–417; 340/988–994; 370/315

(56) References Cited

U.S. PATENT DOCUMENTS

| 5,008,679 | | 4/1991 | Effland et al. ........................ 342/353 |
| 5,289,526 | * | 2/1994 | Chymyck et al. .................... 455/424 |
| 5,293,645 | | 3/1994 | Sood .................................... 455/456 |
| 5,327,144 | * | 7/1994 | Stilp et al. ........................... 342/387 |
| 5,512,908 | * | 4/1996 | Herrick ................................ 342/387 |
| 5,570,099 | | 10/1996 | Desjardinis .......................... 342/378 |
| 5,600,706 | | 2/1997 | Dunn et al. .......................... 455/456 |
| 5,646,632 | | 7/1997 | Khan et al. .......................... 301/375 |
| 5,727,057 | * | 3/1998 | Emery et al. ........................ 379/211 |
| 5,758,288 | | 5/1998 | Dunn et al. .......................... 455/456 |
| 5,926,768 | * | 7/1999 | Lewiner et al. ...................... 455/562 |
| 5,982,324 | * | 11/1999 | Watters et al. .................... 342/357.06 |
| 5,987,329 | * | 11/1999 | Yost et al. ............................ 455/456 |
| 5,999,116 | * | 12/1999 | Evers .................................... 342/36 |
| 6,021,330 | * | 2/2000 | Vannucci .............................. 455/456 |
| 6,026,304 | * | 2/2000 | Hilsenrath et al. .................. 455/456 |
| 6,031,490 | * | 2/2000 | Forssen et al. ...................... 342/457 |
| 6,070,083 | * | 5/2000 | Watters et al. ...................... 455/517 |

OTHER PUBLICATIONS

Kevin J. Krizman, Thomas E. Biedka, and Theodore S. Rappaport, Wireless Position Location: Fundamentals, Implemention Strategies, and Sources of Error, 1997.

Jeffrey H. Reed, Kevin J. Krizman, Brian d. Woerner, and Theodore S. Rappaport, An Overview of of Challenges and Progress in Meeting the E–911 Requirement for Location Service, Apr. 1998.

James J. Caffey, Jr. and Gordon L. Stüber, Overview of Radiolocation in CDMA Cellular Systems, Apr. 1998.

Christopher Drane, Malcolm Macnaughten, and Craig Scott, Positioning GSM Telephones, Apr. 1998.

\* cited by examiner

*Primary Examiner*—Tracy Legree
*Assistant Examiner*—Charles Craver
(74) *Attorney, Agent, or Firm*—Dennis R. Haszko

(57) ABSTRACT

In a mobile communication network, the accuracy of location determinations for mobiles based on TDOA measurements made by the mobiles is increased by measuring the TDOA of signals from base station pairs at a known location and generating correction factors for compensating timing and propagation errors in TDOA measurements made by the mobiles. Calibration terminals may be provided for measuring TDOAs at known locations. System processes and elements for applying data generated by calibration terminals are disclosed.

62 Claims, 5 Drawing Sheets

DEVICES AND PROCESSING IN A MOBILE RADIO COMMUNICATION NETWORK HAVING CALIBRATION TERMINALS

FIELD OF THE INVENTION

The invention pertains to the field of mobile communications. The invention addresses the problem of increasing the accuracy of determination of the location of a mobile unit of a communication system, for example, a CDMA system.

BACKGROUND OF THE INVENTION

In some jurisdictions, regulatory requirements are in force, or planned, that require mobile communication network operators to report the location of a mobile terminal of the network when the mobile makes a call to an emergency service bureau. In the United States, for example, the reported location is required to be accurate to 125 meters in 67% of the cases. Such systems therefore require a reliable manner of accurately determining the location of a mobile. Various other services that require knowledge of the location of a mobile are being provided or are in development.

One way to determine the location of a mobile in an ideal synchronous mobile radio communication system (i.e. one in which all base stations maintain the same or known transmission frequencies, and in which there is a known, stable timing relation between the beginning of transmissions, or of timing markers, transmitted from each base station) is through measurement of the time difference of arrival (TDOA) of radio signals from base stations of the network at the mobile. By measuring the difference in arrival times of radio signals from two base stations having a known timing relationship, the location of the mobile may be determined to lie somewhere along a hyperbolic surface (hyperboloid) between the base stations. If the TDOAs three base or more station pairs are known, the intersection of the hyperboloids defined by the TDOA measurement for each base station pair indicates the geographic position of the mobile. Alternatively, mobile location may be determined through measurement by three or more base stations of the TDOA of signals from a mobile.

The use of TDOA measurements for location determination is dependent upon precise measurements and precise synchronization of network elements. Time of arrival differences must be measured to sufficient resolution to locate a mobile with the desired position accuracy. A TDOA measurement or synchronization error of one microsecond will yield a positional error of approximately 300 meters. Present CDMA mobile communication systems, for example, systems based on the TIA standard IS-95, are designed to provide synchronization of signal timing to within a microsecond. However, this timing uncertainty and the resulting positional error still limits the practical applications of mobile TDOA location services.

SUMMARY OF THE INVENTION

It is an object of the invention to facilitate greater accuracy in mobile location determination.

In general terms, the invention accomplishes this object by measuring the TDOAs of signals from base station pairs at a known location and comparing these measured TDOAs to expected TDOAs to generate correction factors that may be applied to TDOA measurements made by mobiles to reduce errors in mobile location determination and to reduce the need for base station synchronization.

A variety of system processes, system elements and element functionalities are described below in accordance with various embodiments of the invention.

DESCRIPTION OF THE DRAWINGS

The invention will be understood through reference to the following detailed description and the accompanying Figures, in which.

DETAILED DESCRIPTION OF THE INVENTION AND PREFERRED EMBODIMENTS

The invention pertains to devices and processes in a mobile radio communications network comprised of elements that are frequency synchronized, i.e. that oscillate at essentially the same frequency. The invention is embodied in a variety of system processes for generating and using data produced by calibration terminals. Moreover, a variety of functionalities for mobiles, calibration terminals, location servers and base stations in accordance with the invention are contemplated. The particular functionalities provided to mobiles, calibration terminals, location servers and base stations to achieve system processes and subprocesses in accordance with the invention will be determined in part by the performance specifications of the network in which they are implemented. To facilitate a complete understanding of the invention and the many alternatives that may be considered in formulating an implementation, the remainder of the disclosure is presented in three parts. The first part provides an overview of TDOA-based location determinations and the manners in which these determinations are enhanced in accordance with the invention. In the second part, system processes implemented in a network as a whole in accordance with the invention are discussed. The third part provides a discussion of various alternative embodiments of calibration terminals, and describes various corresponding functionalities and interactions of calibration terminals, mobiles, base stations and location servers for carrying out the system processes discussed in the second part.

I. Location determination using TDOA measurements

Location determination using TDOA measurements may be performed in any communication network having a known timing relationship among signals. While the embodiments disclosed herein pertain specifically to CDMA mobile radio systems such as those based on the TIA standard IS-95 and other third generation (3G) wideband CDMA systems, it will be appreciated that they may be applied analogously to other communication networks.

The IS-95 standard CDMA system uses synchronized continuous pilot signals that are broadcast from each base station of the system. The pilot signals provide the most suitable signal for use in TDOA measurement since a mobile will generally be within range of signals from multiple base stations and may perform TDOA measurements using the pilot signal without need for further signalling or special action with respect to any base station.

Figure 1:
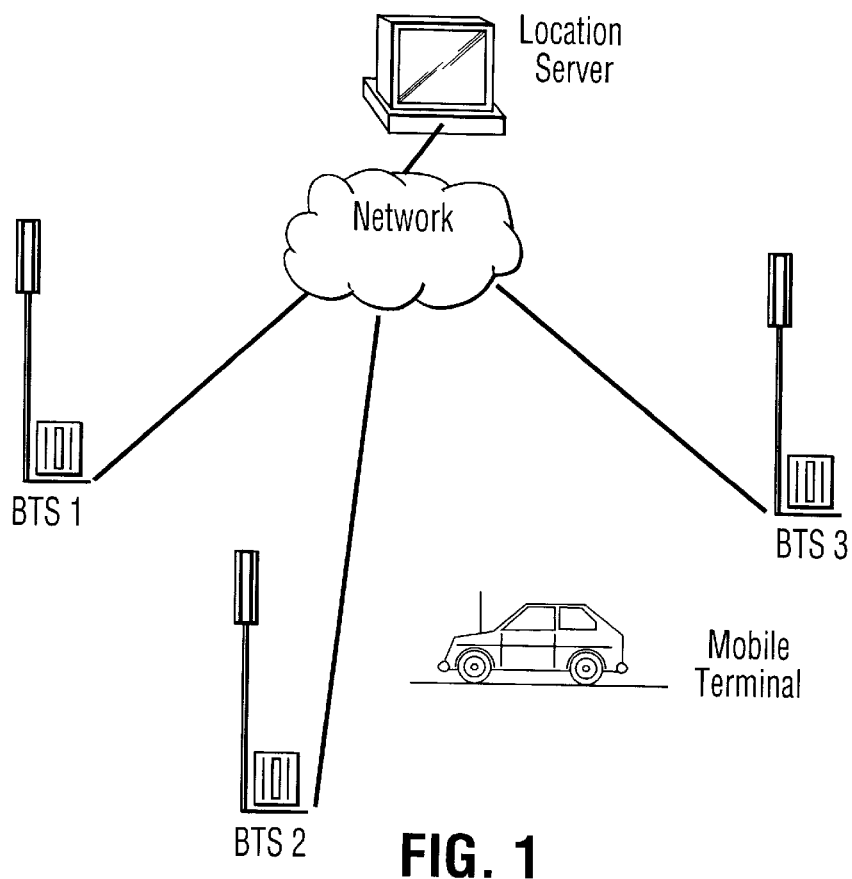
FIG. 1 shows a conventional CDMA communication system.

A conventional cellular system is shown in FIG. 1. As seen in FIG. 1, multiple base stations BTS 1–3 provide radio coverage for mobiles within a region. The base stations are joined by a network which provides traffic and signalling communications between the BTSs and other communication networks. Those having ordinary skill in the art will be familiar with the network elements and their functionalities. A mobile terminal within the coverage region is generally served by the nearest BTS. The mobile will generally also receive signals, although at lower strength, from other nearby base stations.

A system as described above may include a location subsystem, for example, a location server acting in conjunction with other elements of the network. TDOA measurements made by a mobile may be relayed over a messaging channel to the serving base station and from there to the location server, where the TDOA measurements are used to determine the location of the mobile. The location server may be, for example, a workstation attached to the signalling network which includes a database storing the geographic locations of base stations and programming for determining mobile positions based on TDOA measurements. Alternatively, location determinations may be made in the mobile through appropriate processing of the TDOA measurements. This may require the mobile to communicate with a location subsystem of the network if information such as geographic locations of base stations is not maintained on board.

The principals underlying the conventional manner in which location is determined using TDOA measurements is now described with reference to FIG. 2. For purposes of simplicity, FIG. 2 illustrates a two dimensional case, however those having ordinary skill in the art will appreciate that the two dimensional curves represented in FIG. 2 correspond to the three dimensional surfaces that are at issue in real world three dimensional cases.

Figure 2:
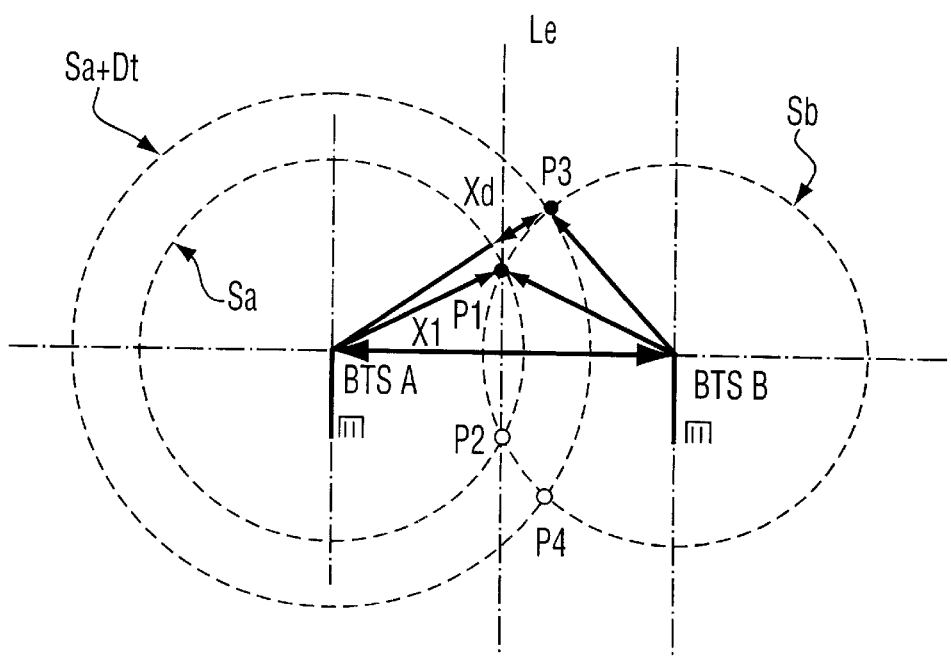
FIG. 2 shows the manner in which TDOA measurements are conventionally used for location determination.

As seen in FIG. 2, synchronized signals are transmitted by base stations BTSA and BTSB. It will be assumed for this example that the transmissions from the base stations begin, or are marked, at the same instants. The instantaneous location in space of a time marker in the signals is represented by circles Sa and Sb, which are centered respectively about base stations BTSA and BTSB. At the represented instant in time, these circles have a radius X1. A mobile at location P1 or P2 at the represented instant in time will see a zero time difference of arrival between the signals from the BTSA and BTSB. Consequently, the mobile may be determined to be equidistant from the base stations. However, the mobile may be at point P1 or P2, or any other location along line Le.

If, in contrast, the mobile is at location P3, then the signals from base stations BTSA and BTSB do not arrive at the same time. The mobile therefore detects a non-zero difference between the time of arrival of the signals. Starting its time measurement when the signal from BTSB is detected, the mobile waits until the signal from BTSA has travelled the extra distance Xd to reach the mobile, and determines the amount of time elapsed between arrival of the signals, i.e., the TDOA of the signals. The TDOA indicates that the mobile is located somewhere along a hyperbolic curve at a distance X1 from BTSB and a distance X1+Xd from BTSA.

It will therefore be appreciated that a single TDOA measurement is not sufficient to determine the location of a mobile. To determine the location of the mobile along its hyperbolic curve, a second and a third TDOA measurement are made. These measurements would typically be made using a signal from a third base station (not shown) and using BTSA or BTSB as references. However, the second and third TDOA measurements may be made using signals from any base stations that are within the receiving range of the mobile. In either case, the second and third TDOA measurements define second and third hyperbolic curves, and the intersection of the hyperbolic curves indicates the location of the mobile.

In conventional TDOA location systems, the accuracy of the location method is not sufficient to locate the mobile along hyperbolic curves per se, but rather is sufficient only to locate the mobile within ranges having hyperbolic boundaries. This is the result of errors in the synchronization and propagation of radio signals from the base stations. It is therefore desirable to minimize the portions of TDOA measurements due to errors so that the region defined by the intersection of the hyperbolic ranges is minimized.

Further information and systems regarding conventional TDOA location systems and methods may be found in Krizman et al., "Wireless Position Location Fundamentals, Implementation Strategies, and Sources of Error", presented at the IEEE Conference on Vehicular Technology, Phoenix, Ariz., May 5–7, 1997. The entirety of this reference is hereby incorporated into the present disclosure for its teachings regarding conventional TDOA location methods and systems.

The invention enhances the accuracy of TDOA location determinations through the use of calibration terminals that are provided at known locations within the coverage area of the network. Calibration terminals measure the TDOAs of signals of base stations pairs within their receiving range. From these measurements, correction factors may be derived and used to enhance the accuracy of location determinations based on TDOA measurements made elsewhere within the coverage area of the network.

Figure 3:
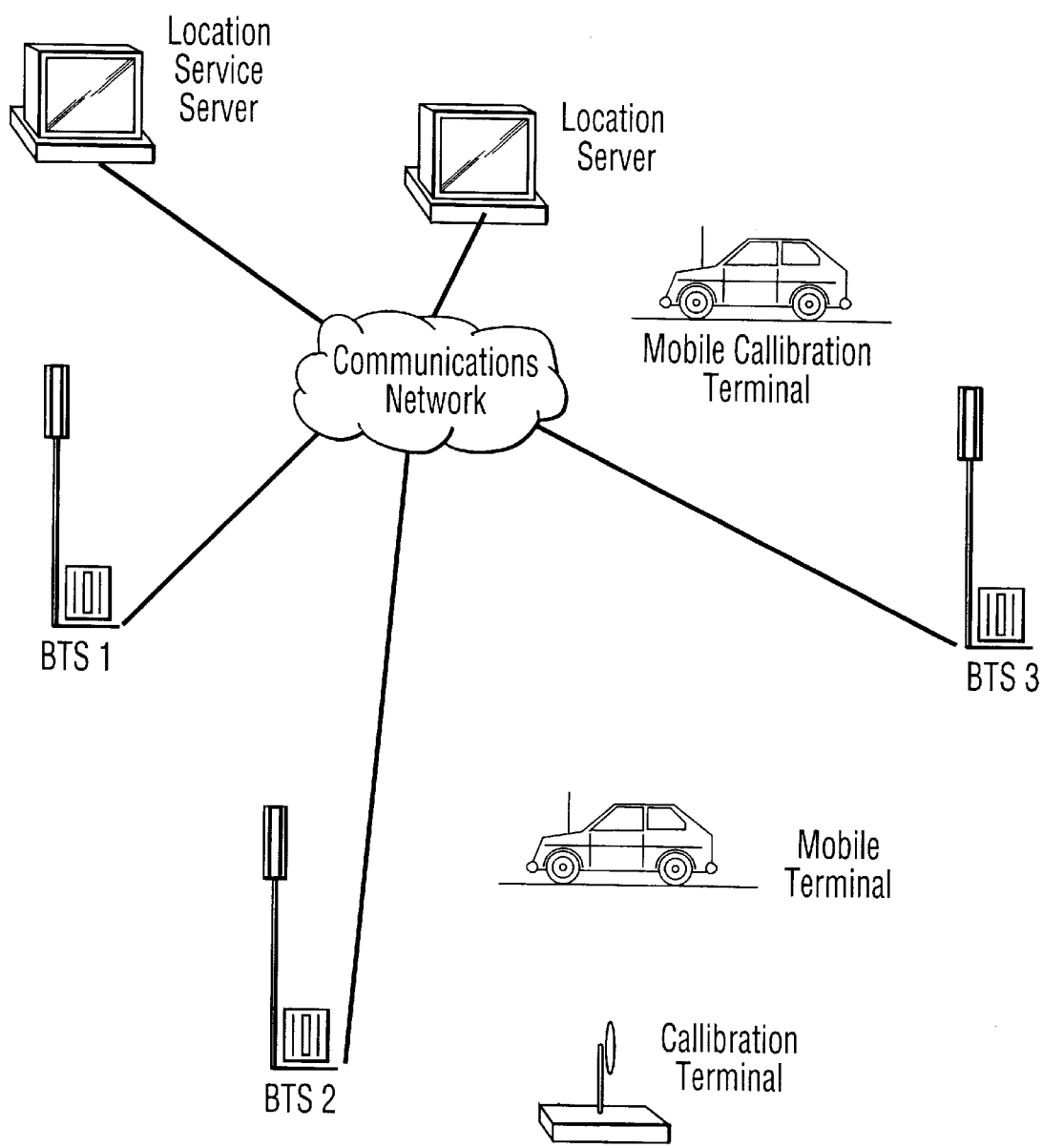
FIG. 3 shows a CDMA system in accordance with the invention.

A mobile communication network in accordance with the invention is illustrated in FIG. 3. As shown in FIG. 3, the system includes the features illustrated in FIG. 1, and further includes one or more calibration terminals for providing calibration TDOA measurements or correction factors for base station pairs of the network. The calibration terminals are provided at known locations. As seen in FIG. 3, a calibration terminal may be a stationary device. The locations of stationary calibration terminals may be stored in an appropriate subsystem of the network, such as a location server, for use in location determinations. In the alternative, a calibration terminal may comprise a mobile device which includes an appropriate system for determining its location with a required accuracy, for example, through the use of a Global Positioning System (GPS) unit. TDOA measurements provided by a mobile calibration terminal may be accompanied by additional information identifying the location of the calibration terminal at the instant at which the TDOA measurement is made. To provide uniformly reliable calibration terminal coverage, it is preferable to locate stationary calibration terminals near locations where mobiles typically make location requests, in locations that typically handle heavy communication traffic, and at additional locations throughout the coverage area of the network to provide a relatively uniform geographic distribution. It is also desirable for the calibration terminals to be at locations that have line of sight radio transmission paths to base stations, and to provide calibration terminals with antennas that allow reception of signals from multiple base stations.

By measuring TDOAs at a known location, calibration terminals allow the network to generate correction factors for improving the accuracy of location determinations using TDOA measurements made at other locations within network. The TDOA measurement may be expressed as tm=td+te, where td is the expected time difference due to the location, and te is the time difference due to errors. The expected value for the time difference may be computed from the standard geometric formula including the known position coordinates of the terminal and the base stations involved. The expected time difference may be computed by calculating the distance from the mobile to one base station minus the distance to the other divided by the speed of radio signal propagation in air. This may be expressed as the formula $$td=(\operatorname{Sqrt}((Xm-Xb1)^2+(Ym-Yb1)^2+(Zm-Zb1)^2)-\operatorname{Sqrt}((Xm-Xb2)^2+(Ym-Yb2)^2+(Zm-Zb2)^2))/c$$

where Xm, Ym, Zm are the coordinates of a calibration terminal, Xb1, Yb1, Zb1 are the coordinates of a first base station, Xb2, Yb2, Zb2 are the coordinates of a second base station, and c is the speed of radio signal propagation in air. Accordingly, an expected value for the time difference td of a signal at the location of a calibration terminal may be determined for any base station pair because the location of the calibration terminal and the locations of the base stations are known. Accordingly, by measuring the TDOA at the known location, the equation can be solved for te, since te=tm−td where tm is the measured TDOA at the location of the calibration terminal and td is the expected value at that location in the absence of errors. The error value te can therefore be determined and corrected in TDOA measurements for use in location determination.

To achieve greater accuracy, the error value may be treated as comprising two components: a systematic error and a variable error. The systematic error component ts results mainly from differences in the times of transmissions at the base stations of the measured base station pair and delays in propagation due to non line-of-sight paths. The variable error component tv arises from a variety of factors which may include changes in the equipment at the base station and changes in environmental factors that alter the propagation time of the radio signals and measurement errors. The systematic error ts has two main components. These are tx, due to unknown differences in transmission timing offsets between the base stations, and tp due to non line-of-sight propagation. For a stationary terminal that has line-of-sight propagation for the received signals from the base stations, the timing error tx may be approximated by averaging a series of error measurements for an interval of approximately a minute. For terminals that may be in motion, the averaging time must be shorter, such that the distance moved during the averaging time is less than the desired accuracy of the error measurement. The averaging interval must also be of sufficient time that the variable errors, tv, will average to zero. Some terminals may have non line-of-sight propagation for the radio signals received from the base stations. For these terminals, the measured systematic error ts will be the sum of the timing and propagation errors (that is: ts=tx+tp). The timing error tx is a characteristic of each base station pair and tx may change slowly over time. The propagation error tp is location dependent as it depends on the radio propagation path to the location.

A "erolling" average technique may be used to determine an average ts that tracks the slowly varying a changes in the error te. The average ts therefore represents any timing error and propagation error at the location where the TDOA measurements are made. The rolling average technique is well known for filtering varying measurements. Measurements are made periodically and each new measurement is averaged with a most recent series of measurements. Measurements prior to the most recent series are discarded so that they no longer contribute to the average. It will be appreciated that other well known averaging techniques may be equivalently employed.

The correction factor to be applied to a TDOA measurement for a base station pair is dependent upon the location at which the TDOA measurement is made. Systematic error due to timing offsets between base stations does not vary with the TDOA measurement location, and so a correction factor for a base station pair may be applied to all TDOA measurements for that base station pair. However, the error determined at a calibration terminal may result in part from non line-of-sight propagation, and so a correction factor determined at the location of a calibration terminal may be accurate only for mobiles within a region around the calibration terminal where non line-of-sight signals are received.

Whether an error correction factor is applied to a TDOA measurement by a mobile, and the value of the correction factor, may be determined in a variety of ways. In accordance with one method, if the difference between TDOA measurements for a base station pair made by a mobile and a calibration terminal is less than a predetermined amount, the correction factor determined by the calibration terminal may be treated as being valid at the location of the mobile. The correction factors provide compensation for both timing errors and non line-of-sight propagation errors within a region around the calibration terminal.

In the alternative, a map of correction factors may be assembled and used to provide correction factors for TDOA measurements based on an approximate location determination made using uncorrected TDOA measurements. Interpolation of correction factors among multiple calibration terminals may be used to provide correction factors for TDOA measurements made in an areas between calibration terminals. The interpolated correction factors provide compensation for both timing errors and non line-of-sight errors. The factors may be applied to TDOA measurements in accordance with a determination of the location of the mobile using uncorrected TDOA measurements.

II. System Processes

Figure 4:
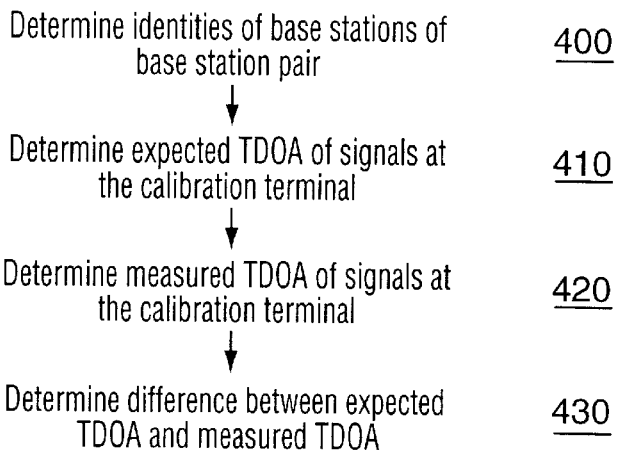
FIG. 4 shows a first system process in accordance with the invention.

A first system process in accordance with the invention involves determination of a correction factor associated with a TDOA measurement for a base station pair. This process is illustrated in FIG. 4. As shown in FIG. 4, identities of the base stations of a base station pair are determined 400. An expected TDOA for signals of the base station pair at the location of a calibration terminal is then determined 410. The expected TDOA is determined by determining the distances between the known location of the calibration terminal and the known locations of the base stations, determining the propagation time under ideal conditions for a signal from each base station to the calibration terminal, and determining the difference of the propagation times. A measured TDOA for the base station pair measured at the calibration terminal is then determined 420. The difference between the expected TDOA and the measured TDOA is then determined 430 to give a correction factor for TDOA measurements of signals from the base station pair. This correction factor represents the time difference of the received radio signals and may be either a positive or negative value.

Figure 5:
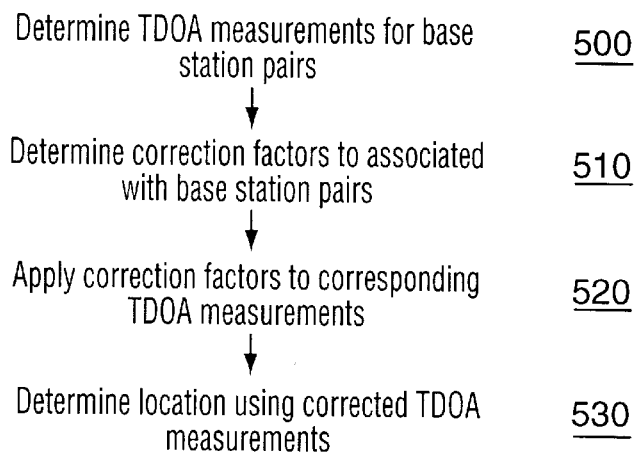
FIG. 5 shows a second system process in accordance with the invention.

A second system process in accordance with the invention involves determination of the location of a mobile using TDOA measurements made by the mobile and correction factors determined using TDOA measurements made by calibration terminals. This process is illustrated in FIG. 5. As shown in FIG. 5, TDOA measurements at the location of the mobile for three or more base station pairs are determined 500. A correction factor for each base station pair is then determined 510. The correction factor for each base station pair is applied 520 to its corresponding TDOA measurement to yield corrected TDOA measurements. A correction factor may be applied by subtracting the correction factor from the corresponding TDOA measurement. A location is then determined 530 using the corrected TDOA measurements.

Figure 6:
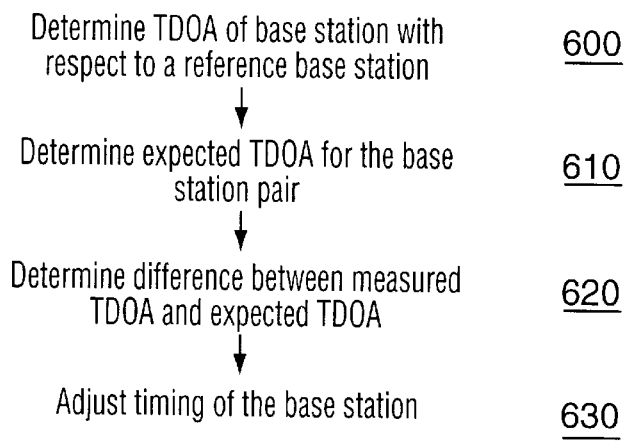
FIG. 6 shows a third system process in accordance with the invention.

A third system process in accordance with the invention involves adjusting the timing of a base station to synchronize the base station with another base station, referred to here as a reference base station. This process is illustrated in FIG. 6. As shown in FIG. 6, the TDOA at a known location of a signal from a base station with respect to a signal from a reference base station is determined 600 by measurement. An expected TDOA for the base station pair at the known location is then determined 610 using the known locations of the base stations and the point of measurement, and the speed of propagation of radio waves in the air. A difference between the measured and expected TDOA is then determined 620. This difference is the synchronization error between the base stations. The timing of the base station at issue is then adjusted 630 by an amount equal to the synchronization error to bring it into synchronization with the reference base station.

III. Specific Embodiments of Network Elements and Corresponding Functionalities

Various alternative embodiments of calibration terminals in accordance with the invention are now described. In all embodiments, it is preferred that the calibration terminal is remotely programmable to facilitate efficient reconfiguration.

Figure 7:
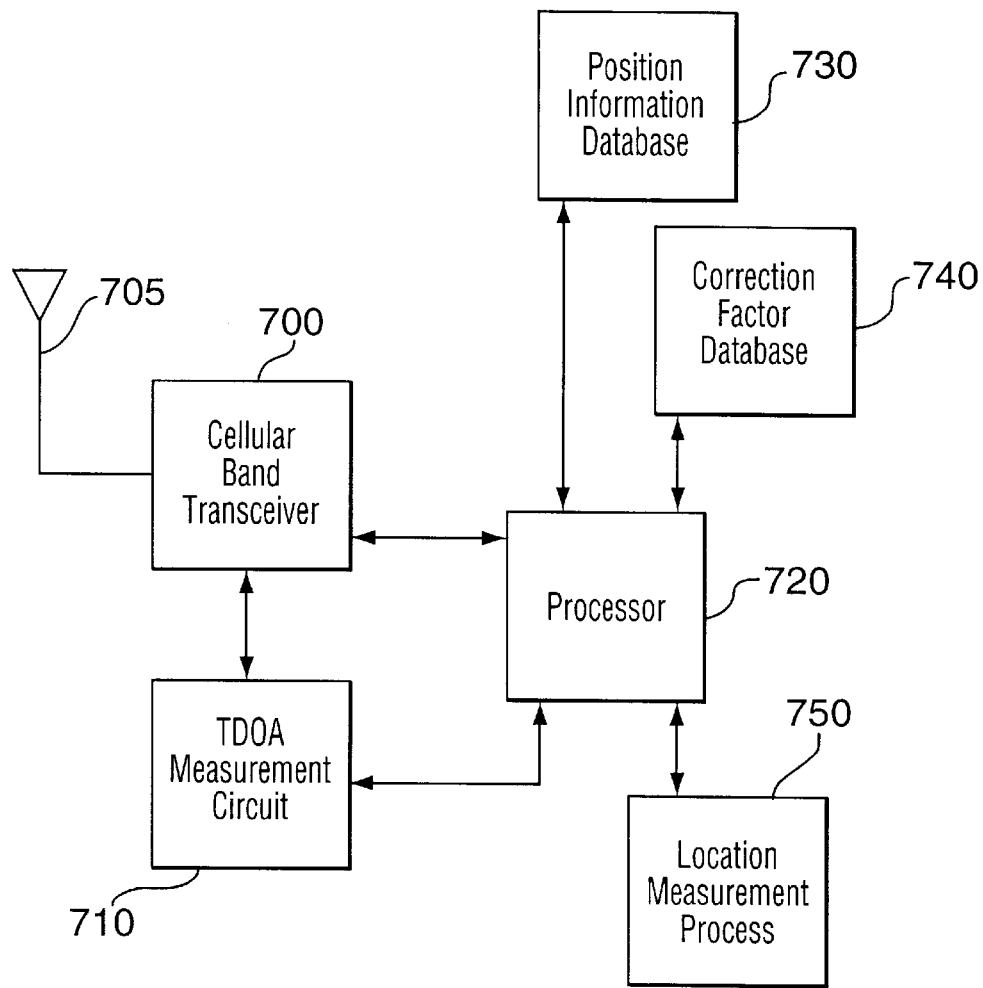
FIG. 7 shows a calibration terminal in accordance with the invention.

FIG. 7 shows a calibration terminal in accordance with the invention. The calibration terminal includes an antenna 705 and cellular band transceiver 700 for broadcasting and receiving signals. A TDOA measurement circuit 710 operating in cooperation with a processor 720 provides TDOA measurements. A position information database 730 stores locations of base stations, which may be fixed in memory or which may be received over the air from a location server of the network. The location of the calibration terminal may also be stored in the position information database. A correction factor database 740 stores correction factors associated with base station pairs of the network.

If the calibration terminal is fixed in its location, then its location may be determined by common surveying methods, or by using map coordinates. The calibration terminal's location may then be entered into the position information database. Such a fixed calibration terminal, if located such that it has a line-of-sight propagation path for signals received from the base stations, is useful for measuring the fixed timing offsets of base stations. Some calibration terminals may be mobile. These terminals may move about the coverage area of the mobile radio network and measure and report calibration information for the correction factor database. These mobile calibration terminals may comprise a location measurement process 750 for determining an instantaneous location of the calibration terminal associated with TDOA measurements made by the calibration terminal. To achieve the needed accuracy of position location, the location measurement process may comprise a basic GPS receiver augmented by a differential GPS (DGPS) process that makes use of locally broadcast corrections for the GPS system. Such a mobile calibration terminal will experience both line-of-sight and non line-of-sight propagation for signals received from base stations depending on its location. The mobile calibration terminal is useful for measuring both the fixed timing offsets of base stations and the position dependent timing offsets due to non line-of-sight propagation.

In operation, the processor 720 requests TDOA measurements from the TDOA measurement circuit 710 for base station pairs of the network. The processor determines correction factors for each base station pair using the TDOA measurements and expected TDOA measurements calculated using the information stored in the position information database 730. Communication of correction factors to other network elements is provided through the cellular band transceiver under the management of the processor. It will be appreciated that other calibration terminal configurations may be employed in accordance with network specification. For example, the correction factor database and the position information database, shown in FIG. 7 as part of the calibration terminal, could be alternatively located in a server attached to the communications network and their contents made available to the calibration terminal processor or network server through the use of the message signaling capabilities of the cellular mobile radio system. Certain other alternative calibration terminal configurations will be apparent from the various calibration terminal processes discussed below.

A calibration terminal may be configured for communication with other network elements in a variety of manners. As a general matter, the calibration terminal communicates by means of radio communication channels with other radio communication elements such as mobiles and base stations. Communication of data to and from calibration terminals may be provided over standard messaging channels.

In a first network configuration, the calibration terminal is configured to periodically report TDOA measurements made at the calibration terminal so that any network element within range can periodically receive TDOA measurements from the calibration terminal. In an alternative configuration, the calibration terminal is configured to be addressable using a generic calibration terminal address. In this configuration, the calibration terminal receives queries broadcast by network elements and addressed to the generic calibration terminal address, and examines the queries to determine if it is capable of providing a response. Where no response can be provided, the query may be ignored, or a null response may be returned. In a second alternative configuration, the calibration terminal is addressable using a unique address such that data from the calibration terminal is provided in response to a query addressed to the calibration terminal. It is noted that the above configurations of the communication interface are not mutually exclusive, but rather may be combined in accordance with network specifications.

A calibration terminal may also be configured for data processing and storage in a variety of manners. In a first configuration, the calibration terminal is configured to periodically make and store TDOA measurements for each base station pair within its range of reception. As an enhancement to this configuration, the calibration terminal may further determine and store correction factors associated with each TDOA measurement. This determination requires information regarding the location of the calibration terminal and the locations of the base stations for which the TDOA measurement is made. This information may be stored in a database in the data storage subsystem of the calibration terminal.

In a second configuration, the calibration terminal is configured to make and store TDOA measurements for a base station pair in response to a query for TDOA measurements for the base station pair. As in the case of the first configuration, this configuration may be enhanced through determination of correction factors. It will be appreciated that the first and second configurations are not mutually exclusive, but rather may be combined in various ways in accordance with network specifications.

In either of the above configurations, it may be desirable, particularly when the calibration terminal is mobile, for the calibration terminal to broadcast and/or store a location of measurement in conjunction with a corresponding TDOA or correction factor data.

To summarize, a calibration terminal may be configured to communicate with the network through periodic reports, specifically addressed queries, and/or generically addressed queries. The calibration terminal may be further configured to periodically make TDOA measurements or to make TDOA measurements upon request. The calibration terminal may provide the further services of determining correction factors or fixed error and variable error correction factors for base station pairs.

Various alternatives for embodiments of mobiles in accordance with the invention are now described. Mobiles include a communication interface, and data processing and storage systems. The various alternative configurations discussed below are implemented in the communication, data processing and data storage subsystems of the mobile, in conjunction with appropriate control programming. Accordingly, the communication, data storage and data processing subsystems and associated control programming comprise the means for performing the functions of each configuration in accordance with the invention.

A function of the mobile in all described configurations is to make TDOA measurements for at least three base station pairs to facilitate location determination. However, the functions comprising location determination may be performed in the mobile or in other network devices in accordance with network specifications.

Where location determination is made on board the mobile, the mobile requires the correction factors to be applied to its TDOA measurements. Correction factors may be received from another network element such as a calibration terminal or location server. Alternatively, correction factors may be calculated on board the mobile in accordance with the methods discussed above. It will be appreciated that on board calculation of correction factors requires information regarding at least the locations of the base stations of three base station pairs, and the location of a calibration terminal and corresponding TDOA measurements for each base station pair. An appropriate combination of mobile functionalities and other device functionalities may be chosen in accordance with network specifications.

Various alternatives for embodiments of location servers in accordance with the invention are now described. In general, a location server is advantageously employed for centralizing information or services required by multiple network elements. Location servers include a communication interface, and data processing and storage subsystems. Location servers may communicate with other network elements such as calibration terminals and mobiles through base stations using messages transmitted over standard messaging channels. The various alternative configurations discussed below are implemented in the communication, data processing and storage subsystems of the location server, in conjunction with appropriate control programming. Accordingly, the communication, data storage and data processing subsystems and associated control programming comprise the means for performing the functions of each configuration in accordance with the invention.

Location servers may be provided with a variety of functionalities in accordance with network specifications. In a first configuration, the location server provides location determinations. Where a location determination for a mobile is made at the location server, the location server requires TDOA measurements made by the mobile and correction factors corresponding to the TDOA measurements. Correction factors may be received from other network elements such as calibration terminals. Alternatively, correction factors may be calculated at the location server in accordance with the methods discussed above. It will be appreciated that calculation of correction factors requires information regarding at least the locations of the base station pairs involved in the measurements, and the location of a calibration terminal and corresponding TDOA measurements for each base station pair. Information pertaining to an average TDOA or correction factor over a period of time may also be required.

In a first alternative configuration, the location server may function solely as a server of data that is needed for calculations in other network elements such as calibration terminals. Information that may be served by a location server includes base station and calibration terminal locations. In practical implementations, this may include information regarding the locations of base stations controlled by other operators. Other data that may be served by a location server includes calibration terminal TDOA measurements for base station pairs and correction factors for base station pairs. A location server may maintain maps of correction factors corresponding to base station pairs. The map may be assembled by receiving correction factors from calibration terminals, or by calculating correction factors using data received from calibration terminals. The map may be augmented through interpolation of correction factors in areas between the locations of calibration measurements to approximate correction factors for areas that are not in the immediate vicinity of the location of calibration measurements. Such a location server may therefor maintain correction factor maps for each base station pair of the network or region of the network.

Various alternatives for embodiments of base stations in accordance with the invention are now described. Base stations include a communication interface, and data processing and storage subsystems. The various alternative configurations discussed below are implemented in the communication interface and the data processing and storage subsystems of the base station, in conjunction with appropriate control programming. Accordingly, the communication, data storage and data processing subsystems and associated control programming comprise the means for performing the functions of each configuration in accordance with the invention.

In conventional systems, base stations generate a periodic signal which includes an identification of the base station. In accordance with the invention, the base station may be configured such that additional information is periodically broadcast, for example, as part of the base station paging signal. The additional information to be broadcast will be determined in accordance with network specifications. The additional information may include the geographic location of the base station, the correction factors for the base station with respect to its neighbors, or the addresses of calibration terminals or location servers where correction factors may be queried. Correction factor data may be acquired from calibration terminals through the network. In a first alternative configuration, the base station may provide this information in response to a query addressed to the base station.

Figure 8:
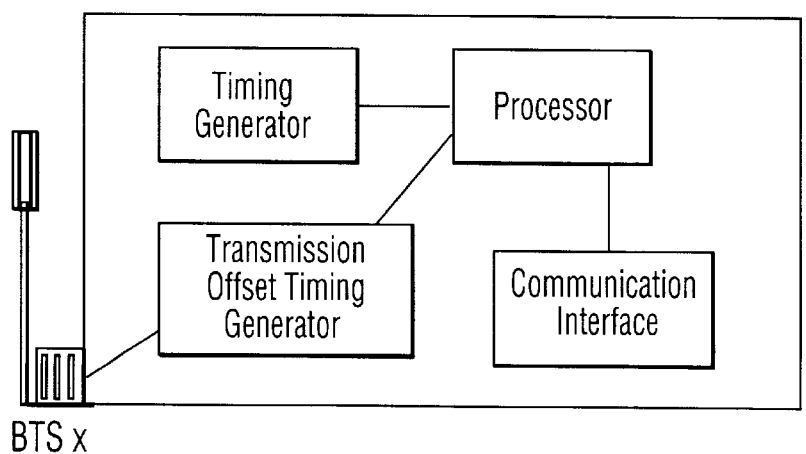
FIG. 8 shows a base station in accordance with an embodiment of the invention.

In a second alternative configuration, the base station may include a synchronization control system for synchronizing the base station with other base stations in conjunction with calibration terminals. An exemplary base station in accordance with this configuration is illustrated in FIG. 8. As shown in FIG. 8, the base station includes, in addition to the processor and communication interface, a timing generator and a transmission offset timing generator. The timing generator provides a time reference for signals broadcast by the base station. The transmission offset timing generator maintains the timing of an offset in the spreading code used to modulate signals broadcast by the base station. In an ideal synchronized system, each base station effectively begins a signal transmission period at the same instant or with a specified timing offset. When a base station is operating out of synchronization, its signal period does not begin at exactly at the same instant, or specified timing offset, as other base stations, but rather somewhere ahead or behind that point. In the illustrated configuration, the processor can adjust the offset timing generator by an amount necessary to begin the signal period at the same instant as another base stations. This requires information regarding the lead or lag time of the base station's signal relative to a reference base station, which may be provided by other network elements such as calibration terminals, mobiles or location servers, depending upon network specifications.

Various network configurations for performing the network processes discussed in Part 2 using the various network element configurations described above are now addressed.

Figure 9:
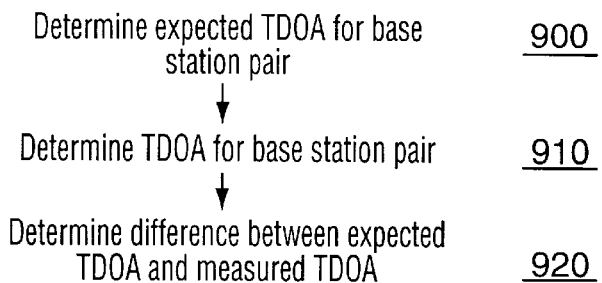
FIG. 9 shows a process in a calibration terminal in a first network configuration in accordance with the invention.

A first network configuration provides determination of correction factors for base station pairs at calibration terminals. A process in a calibration terminal in accordance with this configuration is illustrated in FIG. 9. As shown in FIG. 9, the calibration terminal initially determines 900 the expected TDOA value for signals from a base station pair at the calibration terminal based on the known locations of the base stations and the calibration terminal. The locations of the calibration terminal and base stations may be most simply determined from a database associating base station identifiers with locations specified using a common geographic coordinate system. Such a database may be maintained at the calibration terminal. Alternatively, the database may be maintained at a location server of the network, in which case the locations may be determined by the calibration terminal through an appropriate query to the location server.

The calibration terminal then determines 910 the TDOA value for signals from the base station pair. The calibration terminal then determines 920 the correction factor as the difference between the expected TDOA and the measured TDOA.

The second network configuration is analogous to the first network configuration, except that correction factor determination is migrated to a location server. The location server accordingly performs the processes illustrated in FIG. 9. In this configuration, the TDOA measurement is made by the mo bile terminal and the measurement result is sent to the location server using the message signalling capabilities of the radio system standard. It is noted that in the description of the first configuration, the calibration terminal may maintain the information required for the location determination, or alternatively it may query other network devices for this information. It will be appreciated that in the second configuration, the calibration terminal may maintain the same information as in the first configuration. In this case, the mobile may acquire this information from the calibration terminal by issuing an appropriate query to the calibration terminal.

Figure 10:
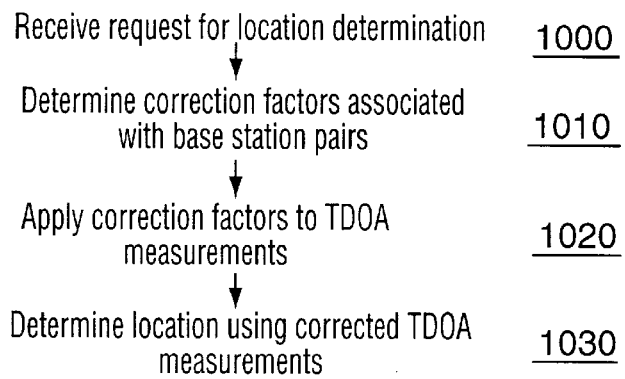
FIG. 10 shows a process in a location server in a third network configuration in accordance with the invention.

A third network configuration provides location determination in a location server of a network. A process in a location server in accordance with this configuration is illustrated in FIG. 10. As shown in FIG. 10, the location server first receives 1000 a request for a location determination. The request may include, for example, identifiers of base station pairs and TDOA measurements for the base station pairs. This request would typically be made by a mobile. Upon receiving the request, the location server determines 1010 correction factors associated with each of the base station pairs. These may be determined through reference to a database of correction factors, if such is maintained by the location server. Alternatively, the location server may query appropriate calibration terminals and receive correction factors, or receive calibration terminal TDOA measurements and determine correction factors in the manner discussed above. In some instances, such as where a mobile calibration terminal is queried, the received information may also include the location at which the TDOA measurements were made.

The correction factors are then applied 1020 to the received TDOA measurements to yield corrected TDOA measurements. The correction factors are applied by subtracting each correction factor from its associated measurement. The location server then determines 1030 a location for the mobile by solving an intersection of hyperbolic surfaces as discussed above. this location calculation may also involve the use of the database of position dependent correction factors.

A fourth network configuration is analogous to the third network configuration, except that location determination is migrated to the mobile. The mobile accordingly performs the processes illustrated in FIG. 10, with the exception that the mobile may initiate the location determination. It is noted that in the description of the third configuration, the location server may maintain information required for the location determination, or alternatively it may query other network devices for this information. In the case of the fourth configuration, the location server may maintain the same information as in the first an d second configurations. In such cases, it will be appreciated that the mobile may determine this information by issuing an appropriate query to the location server.

Figure 11:
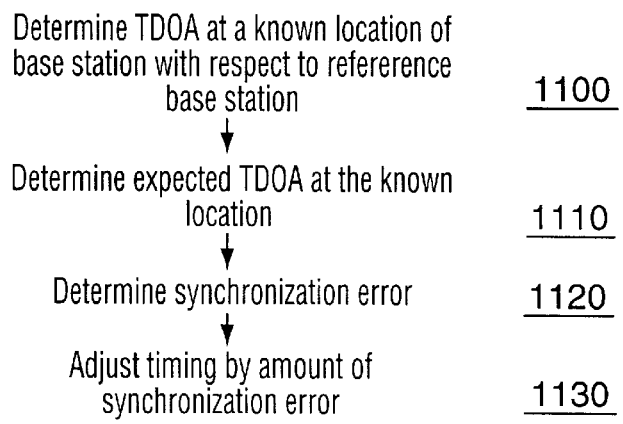
FIG. 11 shows a process in a base station in accordance with a fifth network configuration in accordance with the invention.

A fifth configuration of the network utilizes a calibration terminal to synchronize a base station of the network with respect to a reference base station of the network. A process performed in a base station in accordance with this configuration is illustrated in FIG. 11. As shown in FIG. 11, the process begins with determination 1100 of the TDOA at a known location of a signal from the base station with respect to the reference base station. This may be accomplished by issuing an appropriate query to a calibration terminal receiving signals from the base station and the reference base station, or to a location server that maintains such information, using a standard messaging channel. The query includes an identification of the requesting base station and an identification of the reference base station to which synchronization is to be established. The base station then determines 1110 an expected TDOA at the known location. This may be obtained through a query to the calibration terminal or location server, if such information is calculated or maintained at these network elements. Alternatively, the base station may calculate the expected TDOA using its location, the location of the reference base station, and the location of the calibration terminal. This information may be determined from a database maintained at the base station, or may be determined through queries to a network device or devices that maintain this information, such as calibration terminals or location servers.

The base station then determines 1120 the synchronization error, which may be treated as being equal to the difference between the measured TDOA and expected TDOA. The timing of the base station may then be adjusted 1130 by the amount of the synchronization error to bring the PN offset of the base station into alignment with the PN offset of the reference base station.

Figure 12:
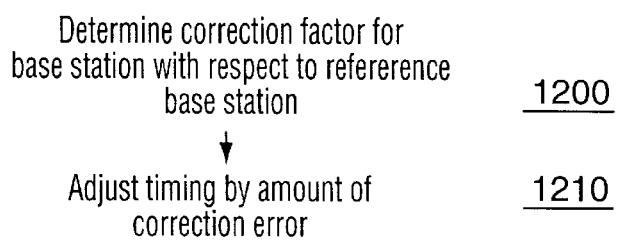
FIG. 12 shows an alternative process in a base station in accordance with a fifth network configuration in accordance with the invention.

In the alternative, the base station may simply obtain the correction factor for the appropriate base station pair and use this as the amount of the synchronization error, if sufficient data to enable its calculation is available within the network. Such information may be provided, for example, by a calibration terminal or a location server. The process in the base station would therefore proceed as illustrated in FIG. 12.

It is noted that it is preferable in accordance with the fifth configuration to provide network location servers such that all information required by the base station may be acquired from a location server using the fixed connection between the base station and the network. While the base station may be provided such that queries for information are directed to calibration terminals, such base stations would not be preferred because conventional base stations do not typically decode the messages transmitted and received over the network signalling channels that they support, and so the additional monitoring necessary for such an embodiment would involve additional equipment and expense, and may therefore be undesirable for some applications.

The configurations described above represent network configurations that are preferred in accordance with various exemplary network specifications. However, those having ordinary skill in the art will recognize from the present disclosure that other network configurations may be implemented in accordance with alternative network specifications. For example, it will be appreciated that in the configurations described above, the amount of processing done in the mobile is generally minimized by delegating tasks such as correction factor determination to other network elements. However, based on the disclosure provided herein, it will also be recognized that mobiles may be configured to perform location determination or correction factor determination. The information needed for such processes may be obtained from other network elements, and the configurations of the other network elements will therefore be determined in part by the information needs of the mobile. Also, while the embodiments specifically addressed herein utilize TDOA measurements for base station signals made at mobiles, the principles, methods and devices disclosed herein may be equally applied to systems utilizing TDOA measurements for mobile stations made by base station pairs.

While the description provided above is intended to disclose the invention and its presently preferred embodiments, those having ordinary skill in the art will recognize further alternative embodiments which may be derived from the above disclosure. Accordingly, the scope of the invention is not limited by the above disclosure, but is intended to encompass the subject matter defined by the appended claims and equivalents thereof.

What is claimed is:

1. A process in a mobile communication network, comprising:

determining an expected time difference of arrival (TDOA) at a known location for signals of at least three base station pairs of the network;

determining a measured TDOA for each of said base station pairs at said known location;

determining an average measured TDOA for each of the base station pairs at said known location for a period of time;

determining a correction factor for each base station pair constituting the difference between the expected and average measured TDOAs;

determining a measured TDOA at a location of a mobile for each of said base station pairs;

for each of said base station pairs, if a TDOA at the location of the mobile differs from a corresponding TDOA at the known location by less than a predetermined amount, applying a corresponding correction factor to said measured TDOA to yield a corrected TDOA; and determining a location using said corrected TDOAs.

2. A mobile communication network, comprising:

means for determining an expected time difference of arrival (TDOA) at a known location for signals of at least three base station pairs of the network;

means for determining a measured TDOA for each of said base station pairs at said known location;

means for determining an average measured TDOA for each of the base station pairs at said known location for a period of time;

means for determining a correction factor for each base station pair constituting the difference between the expected and average measured TDOAs;

means for determining a measured TDOA at a location of a mobile for each of said base station pairs;

means for individually applying a corresponding correction factor to each measured TDOA to yield a corrected TDOA if a corresponding TDOA at the location of the mobile differs from a corresponding TDOA at the known location by less than a predetermined amount; and means for determining a location using said corrected TDOAs.

3. A process in a mobile communication network for synchronizing a base station and a reference base station, comprising:

determining a measured time difference of arrival (TDOA) at a known location of a signal from a base station with respect to a signal from a reference base station;

determining an expected TDOA for the base station with respect to the reference base station;

determining a difference between the measured and expected TDOAs; and adjusting the timing of the base station by the amount of the difference to align a PN offset of the base station with a PN offset of the reference base station.

4. A mobile communication network for providing synchronization of a base station and a reference base station, comprising:

means for determining a measured time difference of arrival (TDOA) at a known location of a signal from a base station with respect to a signal from a reference base station;

means for determining an expected TDOA for the base station with respect to the reference base station;

means for determining a difference between the measured and expected TDOAs; and means for adjusting the timing of the base station by the amount of the difference to align a PN offset of the base station with a PN offset of the reference base station.

5. A process in a mobile communication network for synchronizing a base station and a reference base station, comprising:

determining an average measured time difference of arrival (TDOA) at a known location of a signal from a base station with respect to a signal from a reference base station;

determining an expected TDOA for the base station with respect to the reference base station;

determining a difference between the measured and expected TDOAs; and adjusting the timing of the base station by the amount of the difference to align a PN offset of the base station with a PN offset of the reference base station.

6. A mobile communication network for providing synchronization of a base station and a reference base station, comprising:

means for determining an average measured time difference of arrival (TDOA) at a known location of a signal from a base station with respect to a signal from a reference base station;

means for determining an expected TDOA for the base station with respect to the reference base station;

means for determining a difference between the measured and expected TDOAs; and means for adjusting the timing of the base station by the amount of the difference to align a PN offset of the base station with a PN offset of the reference base station.

7. A process in a mobile of a mobile communication network, comprising:

measuring a time difference of arrival (TDOA) at the mobile for at least three base station pairs of the network;

receiving, from another element of the network, a correction factor associated with each of said base station pairs;

applying said correction factors to corresponding TDOA measurements to yield corrected TDOA measurements; and determining a location from said corrected TDOA measurements.

8. The process claimed in claim 7, wherein receiving correction factors comprises receiving correction factor broadcasts from one or more base stations associating correction factors with base station pairs.

9. The process claimed in claim 7, wherein receiving correction factors comprises querying a location server maintaining a database associating correction factors with base station pairs.

10. The process claimed in claim 7, wherein receiving correction factors comprises querying at least one calibration terminal maintaining a database associating correction factors with base station pairs.

11. The process claimed in claim 7, wherein receiving correction factors comprises receiving correction factor reports from at least one calibration terminal maintaining a database associating correction factors with base station pairs.

12. The process claimed in claim 7, wherein receiving said correction factors comprises:

receiving, from another element of the network, calibration TDOA measurements for said base station pairs made at known locations;

determining expected TDOA measurements for said base station pairs at said known locations; and determining differences between said calibration TDOA measurements and expected TDOA measurements at said known locations for said base station pairs.

13. The process claimed in claim 12, wherein receiving calibration TDOA measurements comprises querying a database associating calibration TDOA measurements with base station pairs.

14. The process claimed in claim 12, wherein receiving calibration TDOA measurements comprises querying a location server maintaining a database associating calibration TDOA measurements with base station pairs.

15. The process claimed in claim 12, wherein receiving calibration TDOA measurements comprises querying calibration terminals maintaining a database associating calibration TDOA measurements with base station pairs.

16. The process claimed in claim 12, wherein receiving calibration TDOA measurements comprises receiving calibration TDOAs reported from calibration terminals maintaining a database associating correction factors with base station pairs.

17. The process claimed in claim 12, wherein determining expected TDOA values comprises querying a database associating expected TDOA measurements with base station pairs and known locations.

18. The process claimed in claim 12, wherein determining expected TDOA measurements comprises querying a location server maintaining a database associating expected TDOA measurements with base station pairs and known locations.

19. The process claimed in claim 12, wherein determining expected TDOA measurements comprises querying calibration terminals maintaining a database associating expected TDOA measurements with base station pairs.

20. The process claimed in claim 12, wherein determining calibration TDOA measurements comprises receiving calibration TDOA broadcasts from calibration terminals maintaining a database associating correction factors with base station pairs.

21. A mobile of a mobile communication network, comprising:

means for measuring a time difference of arrival (TDOA) at the mobile for at least three base station pairs of the network;

means for receiving, from another element of the network, a correction factor associated with each of said base station pairs;

means for applying said correction factors to corresponding TDOA measurements to yield corrected TDOA measurements; and means for determining a location from said TDOA measurements.

22. The mobile claimed in claim 21, wherein said means for receiving correction factors comprises means for receiving correction factor broadcasts from one or more base stations associating correction factors with base station pairs.

23. The mobile claimed in claim 21, wherein said means for receiving correction factors comprises means for querying a location server maintaining a database associating correction factors with base station pairs.

24. The mobile claimed in claim 21, wherein said means for receiving correction factors comprises means for querying at least one calibration terminal maintaining a database associating correction factors with base station pairs.

25. The mobile claimed in claim 21, wherein said means for receiving correction factors comprises means for receiving correction factors reported from calibration terminals maintaining a database associating correction factors with base station pairs.

26. The mobile claimed in claim 21, wherein said means for receiving said correction factors comprises:

means for receiving, from another element of the network, calibration TDOA measurements for said base station pairs made at known locations; and means for determining differences between said calibration TDOA measurements and expected TDOA measurements at said known locations for said base station pairs.

27. The mobile claimed in claim 26, wherein said means for receiving calibration TDOA measurements comprises a database associating calibration TDOA measurements with base station pairs.

28. The mobile claimed in claim 26, wherein said means for receiving calibration TDOA measurements comprises means for querying a location server maintaining a database associating calibration TDOA measurements with base station pairs.

29. The mobile claimed in claim 26, wherein said means for receiving calibration TDOA measurements comprises means for querying calibration terminals maintaining a database associating calibration TDOA measurements with base station pairs.

30. The mobile claimed in claim 26, wherein said means for receiving calibration TDOA measurements comprises means for receiving calibration TDOA measurements reported from calibration terminals maintaining a database associating correction factors with base station pairs.

31. The mobile claimed in claim 26, wherein said means for determining expected TDOA values comprises a database associating expected TDOA measurements with base station pairs and known locations.

32. The mobile claimed in claim 26, wherein said means for determining expected TDOA measurements comprises means for querying a location server maintaining a database associating expected TDOA measurements with base station pairs and known locations.

33. The mobile claimed in claim 26, wherein said means for determining expected TDOA measurements comprises means for querying calibration terminals maintaining a database associating expected TDOA measurements with base station pairs.

34. The mobile claimed in claim 26, wherein said means for determining calibration TDOA measurements comprises means for receiving calibration TDOA broadcasts from calibration terminals maintaining a database associating correction factors with base station pairs.

35. A process in an element of a mobile communication network, comprising:

determining time difference of arrival (TDOA) measurements at the location of a mobile of the network for at least three base station pairs of the network;

receiving, from another element of the network, correction factors corresponding to each of said at least two base station pairs;

applying correction factors to corresponding TDOA measurements to yield corrected TDOA measurements; and determining a location of the mobile from said corrected TDOA measurements.

36. The process claimed in claim 35, wherein determining TDOA measurements comprises receiving TDOA measurements made by a mobile.

37. The process claimed in claim 35, wherein receiving correction factors comprises receiving correction factor broadcasts from one or more base stations maintaining a database associating correction factors with base station pairs.

38. The process claimed in claim 35, wherein receiving correction factors comprises querying at least one calibration terminal maintaining a database associating correction factors with base station pairs.

39. The process claimed in claim 35, wherein receiving correction factors comprises:

receiving, from another element of the network, calibration TDOA measurements for said base station pairs made at known locations; and determining differences between said calibration TDOA measurements and expected TDOA measurements at said known locations for said base station pairs.

40. The process claimed in claim 39, wherein receiving calibration TDOA measurements comprises querying a database associating correction factors with base station pairs.

41. The process claimed in claim 39, wherein receiving calibration TDOA measurements comprises:

determining an uncorrected location of said mobile using said TDOA measurements; and querying a database associating correction factors with base station pairs and geographic locations.

42. The process claimed in claim 39, wherein receiving calibration TDOA measurements comprises querying at least one calibration terminal maintaining a database associating correction factors with base station pairs.

43. An element of a mobile communication network, comprising: means for determining time difference of arrival (TDOA) measurements at the location of a mobile of the network for at least three base station pairs of the network;

means for receiving, from another element of the network, correction factors corresponding to each of said at least two base station pairs;

means for applying correction factors to corresponding TDOA measurements to yield corrected TDOA measurements;

means for determining a location of the mobile from said corrected TDOA measurements; and means for providing the determined location to a service provider specified by the mobile.

44. The element claimed in claim 43, wherein said means for determining TDOA measurements comprises means for receiving TDOA measurements made by a mobile.

45. The element claimed in claim 43, wherein said means for receiving correction factors comprises means for receiving correction factor broadcasts from one or more base stations maintaining a database associating correction factors with base station pairs.

46. The element claimed in claim 43, wherein said means for receiving correction factors comprises means for querying calibration terminals maintaining a database associating correction factors with base station pairs.

47. The element claimed in claim 43, wherein said means for receiving correction factors comprises:
   means for receiving, from another element of the network, calibration TDOA measurements for said base station pairs made at known locations; and
   means for determining differences between said calibration TDOA measurements and expected TDOA measurements at said known locations for said base station pairs.

48. The element claimed in claim 47, wherein said means for receiving calibration TDOA measurements comprises a database associating correction factors with base station pairs.

49. The element claimed in claim 47, wherein said means for receiving calibration TDOA measurements comprises:
   means for determining an uncorrected location of said mobile using said TDOA measurements; and
   means for querying a database associating correction factors with base station pairs and geographic locations.

50. The element claimed in claim 47, wherein said means for receiving calibration TDOA measurements comprises means for querying at least one calibration terminal maintaining a database associating correction factors with base station pairs.

51. A calibration terminal of a mobile communication network, comprising:
   means for determining a time difference of arrival (TDOA) measurement for signals of a base station pair of the network;
   means for determining an expected TDOA of said signals at the location of the calibration terminal;
   means for determining a correction factor for the base station pair constituting a difference between the TDOA measurement and the expected TDOA measurement; and
   means for periodically reporting said correction factor and identification of said base station pair.

52. A calibration terminal of a mobile communication network, comprising:
   means for determining a time difference of arrival (TDOA) measurement for signals of a base station pair of the network;
   means for determining an expected TDOA of said signals at the location of the calibration terminal;
   means for determining a correction factor for the base station pair constituting a difference between the TDOA measurement and the expected TDOA measurement;
   means for receiving a query comprising an identification of said base station pair; and
   means for providing said correction factor in response to said query.

53. A calibration terminal of a mobile communication network, comprising:
   means for determining an average measured time difference of arrival (TDOA) for signals of a base station Pair of the network;
   means for determining an expected TDOA of said signals at the location of the calibration terminal;
   means for determining a fixed error correction factor constituting a difference between the average of TDOA measurements and the expected TDOA measurement; and
   means for periodically reporting said correction factor and identification of said base station pair.

54. A calibration terminal of a mobile communication network, comprising:
   means for determining an average measured time difference of arrival (TDOA) for signals of a base station pair of the network;
   means for determining an expected TDOA of said signals at the location of the calibration terminal;
   means for determining a fixed error correction factor constituting a difference between the average of TDOA measurements and the expected TDOA measurement;
   means for receiving a query comprising an identification of said base station pair; and
   means for providing said fixed error and variable error correction factors in response to said query.

55. A process in a base station of a communication network, comprising:
   providing a query to a calibration terminal of said network comprising identification of said base station and a reference base station;
   receiving a difference of a time difference of arrival (TDOA) at a known location of a signal from said base station relative to a signal from the reference base station and an expected TDOA at said known location of a signal from said base station relative to a signal from said reference base station; and
   adjusting timing of said signal of said base station by an amount of said difference to align a PN offset of the base station with a PN offset of the reference base station.

56. A base station of a communication network, comprising:
   means for providing a query to a calibration terminal of said network comprising identification of said base station and a reference base station;
   means for receiving a difference of a time difference of arrival (TDOA) at a known location of a signal from said base station relative to a signal from the reference base station and an expected TDOA at said known location of a signal from said base station relative to a signal from said reference base station; and
   means for adjusting timing of said signal of said base station by an amount of said difference to align a PN offset of the base station with a PN offset of the reference base station.

57. A process in a base station of a communication network, comprising:
   determining a difference of an average measured time difference of arrival (TDOA) at a known location of a signal from said base station relative to a signal from a reference base station and an expected TDOA at said known location of a signal from said base station relative to a signal from said reference base station; and
   adjusting timing of said signal of said base station by an amount of said difference to align a PN offset of the base station with a PN offset of the reference base station.

58. The process claimed in claim 57, wherein determining a difference comprises:

provide a query to a network element maintaining a database associating base stations pairs and average TDOAs; and receiving said average.

59. A base station of a communication network, comprising:

means for determining a difference of an average measured time difference of arrival (TDOA) at a known location of a signal from said base station relative to a signal from a reference base station and an expected TDOA at said known location of a signal from said base station relative to a signal from said reference base station; and means for adjusting timing of said signal of said base station by an amount of said difference to align a PN offset of the base station with a PN offset of the reference base station.

60. The base station claimed in claim 59, wherein said means for determining a difference comprises:

means for determining a network element maintaining a database associating said base station pairs and average TDOAs over a period of time;

means for providing a query to a determined network element comprising identification of said base station and said reference base station; and means for receiving said average.

61. A process in a base station of a communication network, comprising:

providing a query to a calibration terminal of said network comprising identification of said base station and a reference base station;

receiving from the calibration terminal a correction factor for time difference of arrival (TDOA) measurements for said base station and said reference base station;

storing said correction factor; and periodically broadcasting said correction factor in conjunction with identification of said base station and said reference base station.

62. A base station of a communication network, comprising:

means for providing a query to a calibration terminal of said network comprising identification of said base station and a reference base station;

means for receiving from said calibration terminal a correction factor for time difference of arrival (TDOA) measurements for said base station and said reference base station;

means for storing said correction factor; and means for periodically broadcasting said correction factor in conjunction with identification of said base station and said reference base station.

* * * * *